Jan. 8, 1963
L. J. LEMOINE
3,071,813
PLASTIC INJECTION MOLDING MACHINE
Filed July 15, 1960
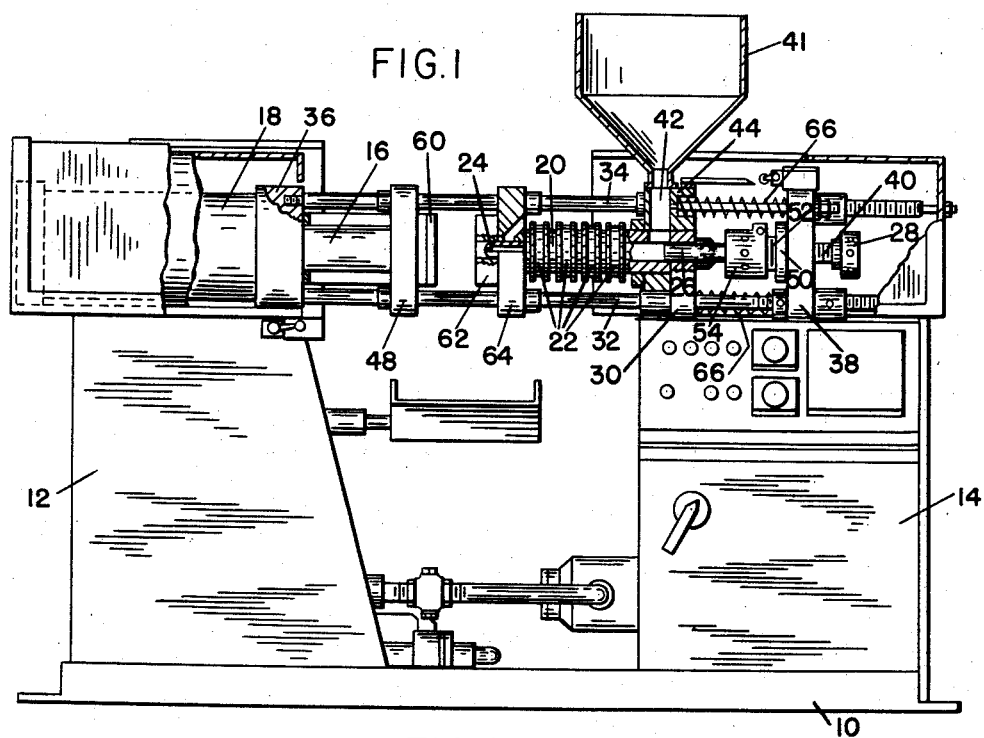
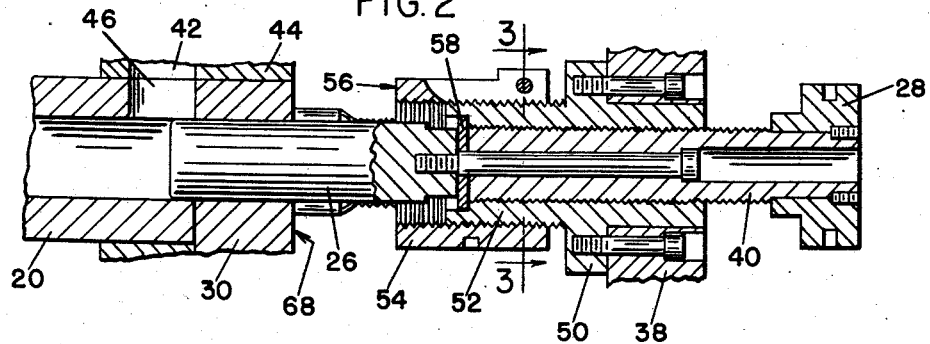
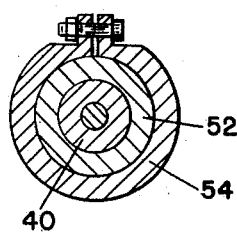
INVENTOR
LEONARD J. LEMOINE
*by Charles R. Fay*
ATTORNEY

United States Patent Office 3,071,813
Patented Jan. 8, 1963

3,071,813
PLASTIC INJECTION MOLDING MACHINE
Leonard J. Lemoine, 325 Hamilton St., Leominster, Mass.
Filed July 15, 1960, Ser. No. 43,120
1 Claim. (Cl. 18—30)

This invention relates to a new and improved plastic injection molding machine, and the principal object of the invention resides in the provision of a machine for relatively light weight work which is based on the disclosure in my prior Patent No. 2,916,770, issued December 15, 1959.

The invention in the present case resides in the provision of a new and improved lock nut which may be used as an abutment for extreme accuracy in stopping and positioning the die-holding blocks in the motion thereof under influence of a ram, said ram as in the previous patent moving one die-holding block towards the other, closing the dies, and retracting the cylinder upon which is mounted the injection molding nozzle, etc. in order to provide for a charge of powder to be automatically dumped therein, whereupon the powder is heated by conventional heating means surrounding the cylinder to be injected into the now-closed die by reason of the fact that the cylinder is retracted with relation to a plunger mounted in fixed but adjustable position with relation to the cylinder, said lock nut being quickly and easily adjusted to form the abutment for the aforementioned block in order to prevent the die blocks from tending to open up in the absence of the lock-nut under a relatively heavy charge of molding powder.

It is to be understood that the present machine is a very light weight machine and in general will produce but one molded article at each cycle. However, if it is desired to mold a heavier article than that usually encountered, the stop lock nut is used to firmly hold all of the parts in position and against opening up when the pressure becomes a little higher than would otherwise be the case with a smaller lighter part being molded.

The invention further relates to arrangements and combinations of parts which will be hereinafter described and more particularly set forth in the appended claim.

Reference is to be had to the accompanying drawings, in which:

FIG. 1 is a view in side elevation of the machine embodying the invention;

FIG. 2 is an enlarged sectional view showing the invention; and

FIG. 3 is a section on line 3—3 of FIG. 2.

In carrying out the present invention, the mechanism may be conveniently mounted on a base or the like 10 and there are provided a pair of standards 12 and 14, these standards being spaced as clearly shown. Standard 12 houses a ram 16 which is mounted to be actuated by means of a hydraulic cylinder 18 or the like.

Standard 14 mounts the injection cylinder which is indicated at 20, heating means therefor being shown at 22, this heating means being conventional. The injection nozzle is indicated at 24 and this nozzle may be of any kind which is standard or conventional. In the cylinder 22 and cooperating therewith there is a plunger 26, this plunger being relatively fixed but longitudinally adjustable by means of a hand wheel or the like 28. The cylinder 20 may be mounted to reciprocate in any way desired as for instance in a block or the like 30 which is mounted on more or less customary slide rods 32 and 34. These rods may extend from the housing for the ram at 18 as indicated at 36 to a stationary block 38 in which the adjustable screw 40 is threaded. This screw is moved longitudinally by turning the hand wheel 28 in order to position plunger 26 relative to the position of the cylinder, plunger 26 being mounted on the screw.

A powder hopper is shown at 41 and this hopper is preferably mounted to discharge powder through an opening 42 and a member 44 which may be mounted on the block 30. Passage 42 communicates with another passage 46 in the cylinder (see FIG. 2) and this passage may be partly obstructed by means of the forward end of the plunger 26, depending upon its position as determined by the screw 40, to provide varying amounts of charges, i.e., powder to be deposited inside the cylinder 20. The forward or righthand end of ram 16 is provided with a die block 48 or the like.

In the present case, the block 38 carries an insert 50 upon which is mounted a relatively large screw-threaded member 52 and on member 52 there is mounted a lock nut 54. The screw-threaded member 40 may extend through member 52 and through the lock nut 54. It is to be seen that upon rotation of lock nut 54 on screw-threaded member 52, the leading face thereof at 56 may be repositioned longitudinally, as desired. The plunger 26 is receivable within the nut 54 to abut the leading end of screw-threaded member 40 by the intermediary of a plate 58 or the like.

Assuming that a pair of removable die blocks or the like at 60 and 62, the operation of the machine starts with the ram 16 moving to the right. Die part 60 engages die parts 62 and continued motion of ram 16 causes the block 64 in which is held nozzle 24 to be retracted against the action of springs 66 substantially as described in my above identified patent. As the cylinder 20 is thereby moved to the right, the plunger 26 relatively moves to the left in the cylinder because the plunger 26 is fixed and this causes squeezing of the heated powder through nozzle 24 into the now closed die plates.

It has been found, however, that if the charge is a fairly large one, i.e., one in which the passage at 46 is largely unobstructed to start with and a large charge of powder is required in order to make the molded article, the pressure in the cylinder sometimes causes the dies to tend to open prematurely.

I have found, however, that this can be overcome by provision of the lock nut 54 which abuts against the righthand surface at 68 (FIG. 2) of the die block 30. In other words, by adjusting the lock nut 54 to a certain position which causes the parts to be stopped rigidly in such position, the pressure of the ram is not overcome by the relatively large charge involved. The lock nut 54 is very minutely adjustable and its position is usually found at the start of any run of any particular item by trying cycles and by adjusting the lock nut 54 by hand to the most efficient position. However, the lock nut 54 is not always used if the charge is a relatively light one inasmuch as the problem does not arise, but in cases where the charge is a relatively heavy one, it is found essential to back up plate 30 against the thrust of the ram at a certain location and this has been found to be efficiently accomplished by means of the presence of the adjustable lock nut at 54 which is particularly effective because its surface 56 is relatively large, certainly as compared with the area of the cross section of the plunger.

Having thus described my invention and the advantages thereof, I do not wish to be limited to the details herein disclosed, otherwise than as set forth in the claim, but what I claim is:

A plastic injection molding machine comprising a base, a ram cylinder on said base, a ram slidably received in said ram cylinder, a plurality of spaced parallel slide rods fixed to said ram cylinder and projecting axially therefrom in surrounding relationship to said ram, a die part carried by said ram, a die block slideably mounted on said rods, a second die part carried by said die block in alignment with said first die part, a cylinder block slidably mounted on said rods, an injection cylinder carried by said cylinder block in opposed relation to said die block, an injection nozzle on one end of said injection cylinder cooperating with said second die part, the opposite end of said injection cylinder being open, said injection cylinder having an aperture in the wall thereof, a hopper connected to said cylinder block and communicating directly with the aperture for supplying plastic material by gravity to said injection cylinder at each reciprocation of the cylinder block, a piston block adjustably fixed on said rods in spaced relation to said cylinder block, an internally and externally threaded tubular member fixed to said piston block and projecting therefrom toward said cylinder block, a piston threadedly received for axial adjustment in said tubular member and having one end slidably disposed in the open end of said injection cylinder, said piston injecting the plastic material through the nozzle upon movement of the cylinder block under influence of the ram in a direction to force said cylinder rearwardly relative to said piston, said piston closing the aperture during a portion of the movement of said cylinder block and cutting off the supply of plastic material from said hopper, spring means disposed between said cylinder block and said piston block to urge said last named blocks apart and retract said piston upon completion of an injection stroke and a lock nut threadedly received on said tubular member and projecting forwardly therefrom to engage said cylinder block and stop the rearward movement thereof with respect to said piston block at a location determined by the adjustment of said lock nut on said tubular member thereby precluding separation of said die parts at the instant of maximum pressure to prevent escape of plastic material between said die parts.

References Cited in the file of this patent

UNITED STATES PATENTS

| | | |
|---|---|---|
| 1,964,709 | Winnertz | June 26, 1934 |
| 1,997,074 | Novotny | Apr. 9, 1935 |
| 2,781,546 | Hallenbeck et al. | Feb. 19, 1957 |
| 2,841,824 | Harvey | July 8, 1958 |
| 2,880,461 | Gaspar et al. | Apr. 7, 1959 |
| 2,916,770 | Lemoine | Dec. 15, 1959 |